United States Patent [19]

Johansson

[11] Patent Number: 5,553,108
[45] Date of Patent: Sep. 3, 1996

[54] WATER ROD ATTACHMENT IN A NUCLEAR REACTOR FUEL BUNDLE

[75] Inventor: Eric B. Johansson, Wrightsville Beach, N.C.

[73] Assignee: General Electric Company, Schenectady, N.Y.

[21] Appl. No.: 334,388

[22] Filed: Nov. 3, 1994

[51] Int. Cl.⁶ .................................................. G21C 3/322
[52] U.S. Cl. ............................................. 376/444; 376/446
[58] Field of Search ................................. 376/446, 444, 376/440, 437, 451, 453, 454

[56] References Cited

U.S. PATENT DOCUMENTS

| | | | |
|---|---|---|---|
| 4,314,884 | 2/1982 | Fanning et al. | 376/444 |
| 4,492,668 | 1/1985 | Pilgrim, Jr. et al. | 376/440 |
| 4,675,154 | 6/1987 | Nelson et al. | 376/444 |
| 5,174,949 | 12/1992 | Johansson | 376/444 |
| 5,347,560 | 9/1994 | Lippert et al. | 376/444 |

*Primary Examiner*—Daniel D. Wasil
*Attorney, Agent, or Firm*—Nixon & Vanderhye P.C.

[57] ABSTRACT

In a fuel bundle assembly (B) for a nuclear reactor wherein a plurality of fuel rods (R) and at least one water rod (W) extend between an upper tie plate and a lower tie plate, an improvement includes a fixed connection between the water rod (W) and the lower tie plate (L), the fixed connection including a threaded lower end plug of the water rod and a threaded hole in a boss formed in the lower tie plate adapted to receive the threaded lower end plug, the threaded lower end plug (50) formed with a diametrical slot (54) therein and the boss (56) formed with a pair of slots (60, 62) extending from opposite sides of the hole such that the diametrical slot (54) and the pair of slots (60, 62) are alignable when the threaded lower end plug (50) is threaded into the boss (56); and a key (64) insertable within the aligned slots to thereby fix the water rod against rotational movement.

4 Claims, 4 Drawing Sheets

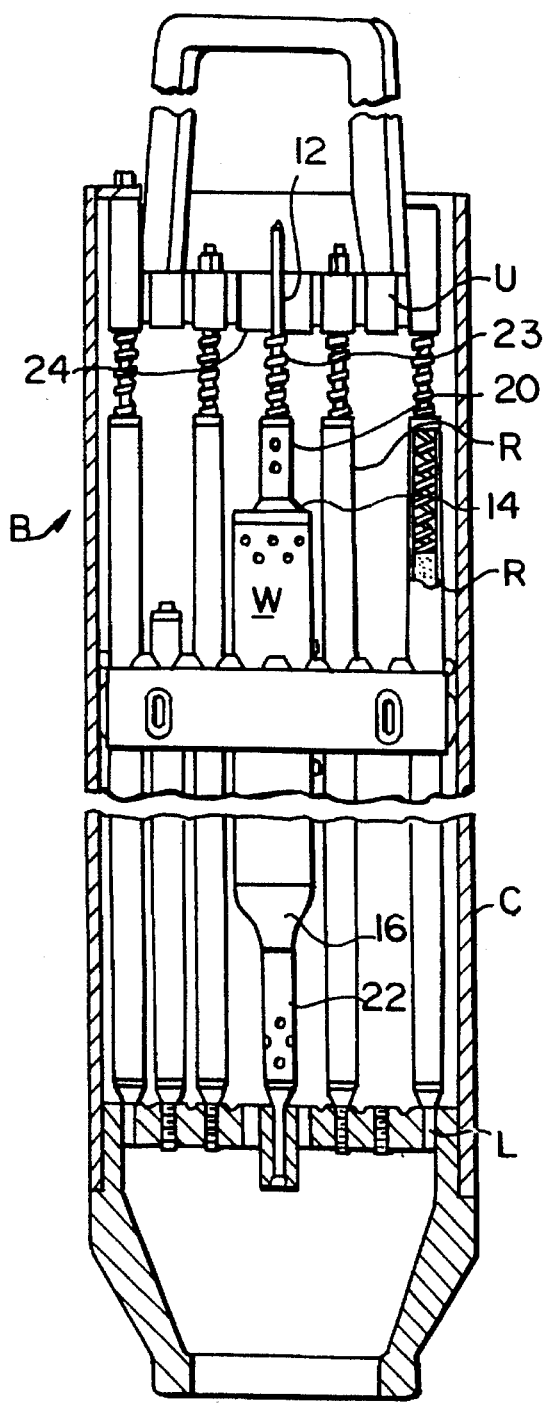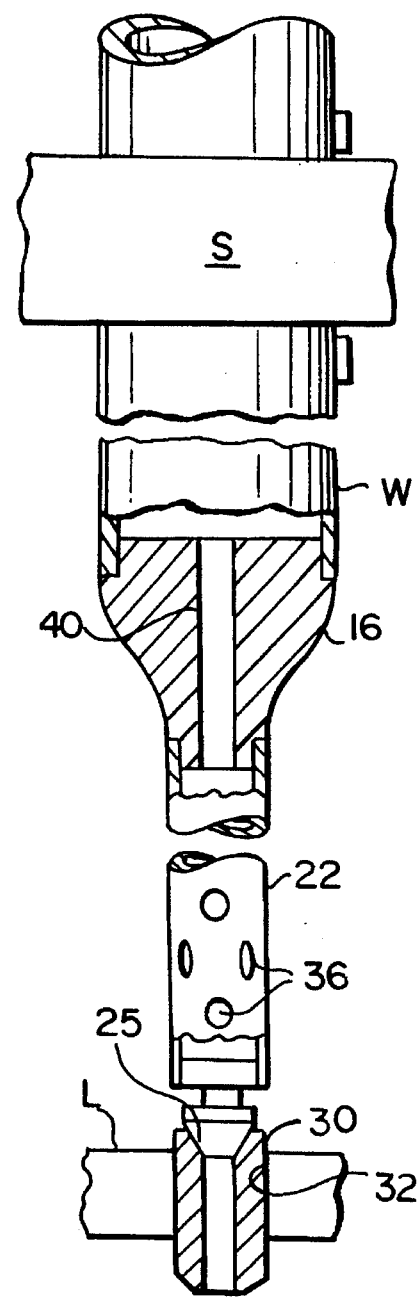
FIG. 1
PRIOR ART
FIG. 2A
PRIOR ART

WATER ROD ATTACHMENT IN A NUCLEAR REACTOR FUEL BUNDLE

TECHNICAL FIELD

This invention relates generally to fuel bundle constructions for boiling water nuclear reactors, and specifically to water rod attachment techniques within such bundles.

BACKGROUND PRIOR ART

FIGS. 1, 2A and 2B of this application illustrate a conventional fuel rod bundle assembly B for a boiling water reactor (BWR) including an upper tie plate U, a lower tie plate L and a matrix of vertically upstanding fuel rods R extending between the two tie plates. The tie plates support the fuel rods R and also permit the inflow of water at the lower tie plate L and the out flow of water and generated steam at the upper tie plate U. An elongated channel C of substantially square cross sectional shape encloses the fuel rods R and confines the fluid flow within the fuel bundle B to a path between the respective tie plates L and U. Similar constructions are disclosed in commonly owned U.S. Pat. Nos. 5,174,949 and 4,675,154.

To aid in equalizing neutron moderation, the fuel bundle B is fitted with a large water tube or rod W for conveying relatively cool water upward through the central region of the fuel assembly. Typically, the water rod W occupies four lattice positions in the fuel rod bundle, displacing four fuel rods. Transition pieces 14, 16 at the top and bottom of the rod connect the large diameter central part of the water rod to smaller diameter tubes 20, 22, respectively. At the upper end of the rod (see especially FIG. 2B), the small diameter tube 20 terminates in a circular end plug 12 which fits into the upper tie plate U. A spring 23 fits over the end plug 12 and bears against the lower surface 24 of the upper tie plate U. The spring 23 biases the water rod W downwardly against the lower tie plate L.

Referring to FIG. 2A, the smaller diameter tube 22 at the lower end of the water rod W has a tapered flange 25 received in a square end plug 30 which, in turn, fits into a square hole 32 in the lower tie plate L. The square end plug 30 and square hole 32 prevent rotation of the water rod W. Such rotation must be prevented to insure capture of the fuel bundle spacers (one of several shown at S) to the water rod W. The function of the small diameter tube 22 is to provide flexibility to accommodate seismic movement of the lower tie plate L relative to the large water rod W in the fuel bundle B.

The lower tube 22 has relatively large diameter holes 36 in its lower portion. These holes 36 act as inlets for water from the single phase region at the bottom of the fuel bundle B. These inlet holes must be near the bottom of fuel bundle B to insure that only water and no steam enters water rod W. The upper end of tube 22 communicates with a central hole 40 in the lower transition piece 16, through which water enters the main large diameter part of water rod W. This hole 40 acts as an orifice and is sized to provide the correct water flow through the water rod W. Water exits the large diameter portion of the water rod through holes 42 at the upper end of the large diameter portion of rod W, as illustrated in FIG. 2B. In addition, the spring loaded rod 20 at the upper portion of water rod W is provided with holes 44 to provide required local circulation.

As already noted, circular water rods have been used to capture the fuel rod spacers S located along the length of the bundle B, to prevent axial movement of the spacers S with respect to the fuel rods R and the water rod W, and also to assist in the fuel bundle assembly process. Tabs (not shown) are welded on the water rod W at axial locations just above and below the location of each spacer S. The water rod W is inserted through the spacers S with an angular orientation such that the tabs pass through the spacers S. The water rod W is then rotated to a locked orientation. As already noted above, the square lower end plug 32 is inserted into the square lower tie plate hole 34. The water rod W thus remains fixed against rotation in that angular orientation while the tabs prevent any axial movement of the spacers S.

DISCLOSURE OF THE INVENTION

The invention here provides a simple yet highly reliable connection between one or more (two in the exemplary embodiment) water rods and the lower tie plate. In the preferred arrangement, the lower end plug of the water rod is threaded, but is also formed with a diametrical slot extending across and through the threaded end. At the same time, the lower tie plate boss is formed with a threaded hole for receiving the end plug. In accordance with this invention, the boss is formed with a pair of aligned slots on diametrically opposed sides of the hole. When the slot in the end plug is aligned with the slots in the boss, a key may be inserted through the three aligned slots to lock the water rod in the correct angular position. The key may then be fixed to the lower tie plate boss by a small weld to ensure that it does not come loose.

In its broader aspects, therefore, the present invention relates to a fuel bundle assembly for a nuclear reactor wherein a plurality of fuel rods and at least one water rod extend between an upper tie plate and a lower tie plate, the improvement comprising first means for removably securing the water rod to the lower tie plate; and second means for cooperating with the first means and for locking the water rod against rotation relative to the lower tie plate.

In another aspect, the invention relates to a fuel bundle assembly for a nuclear reactor wherein a plurality of fuel rods and at least one water rod extend between an upper tie plate and a lower tie plate, the improvement comprising a fixed connection between said water rod and the lower tie plate, the fixed connection including a threaded lower end plug of the water rod and a threaded hole in a boss formed in the lower tie plate adapted to receive the threaded lower end plug, the threaded lower end plug formed with a diametrical slot therein and the boss formed with a pair of slots extending from opposite sides of the hole such that the diametrical slot and the pair of slots are alignable when the threaded lower end plug is threaded into the boss; and a key insertable within the aligned slots to thereby fix the water rod against rotational movement.

It should be noted that the above described water rod attachment technique can be applied to one or both of the water rods in the bundle. The above described arrangement permits the elimination of the attachment components described above at the upper end of the water rod, i.e., the upper end plug 12, the upper extension tube 20, transition piece 14 and spring 23.

Other objects and advantages of the invention will become apparent from the detailed description which follows.

BRIEF DESCRIPTION OF THE DRAWINGS

FIG. 1 is a partial side elevation, partly sectioned, illustrating a conventional fuel bundle construction;

FIG. 2A is an enlarged detail taken from FIG. 1, illustrating the lower end of a water rod within the bundle;

BEST MODE FOR CARRYING OUT THE INVENTION

Figure 2B:
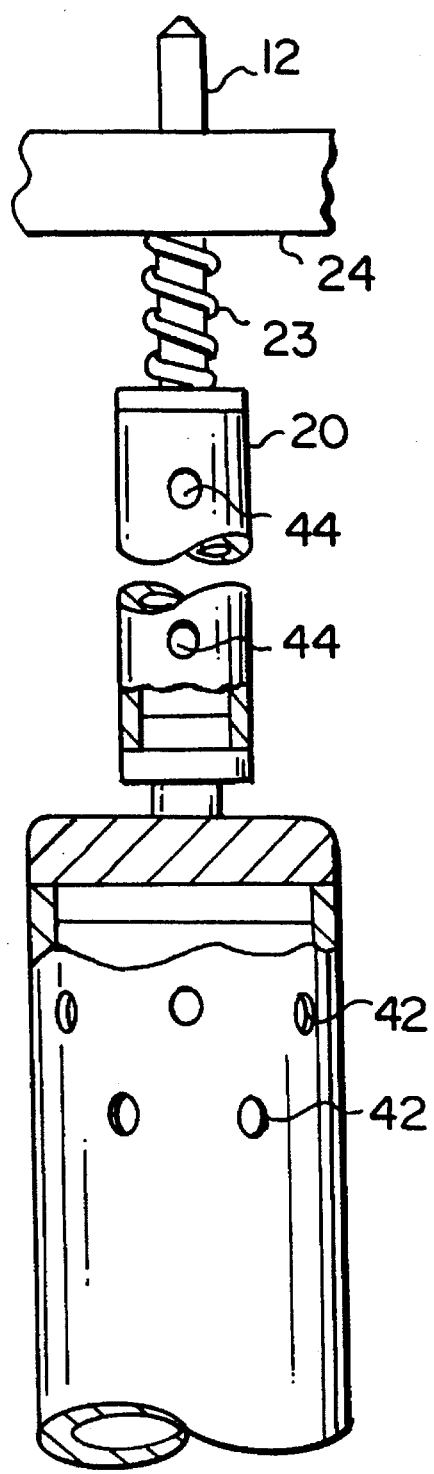
FIG. 2B is another enlarged detail taken from FIG. 1, illustrating the upper end of the water rod within the bundle.

In accordance with this invention and as already noted above, the upper portion of the conventional water rod W including the upper end plug 12, extension tube 20, and hold down spring 23 can be eliminated, and the upper end of the water rod left open. This arrangement, however, requires other means for securing the water rod and for preventing axial movement and rotation thereof. The invention here is easily understood from FIG. 3 which illustrates the invention as applied to a simplified lower tie plate. Specifically, a lower end plug 50 is threaded as shown at 52, and is provided with a transversely oriented, diametrical slot 54 extending from the free end of the plug, axially over part of the length of the plug. At the same time, a boss 56 in the lower tie plate 57 which receives the lower end plug 50 is threaded on its interior surface, as shown at 58, and is also formed with a pair of aligned, diametrically opposed slots 60, 62. It will be appreciated that when the lower end plug 50 is threaded into the boss 56, slots 54, 60 and 62 may be radially aligned so that a key 64 can be inserted through the slots 54, 60 and 62 to lock the water rod W in the correct angular position, and to prevent further rotation thereof in either direction. By thus preventing rotational movement of the threaded end plug, axial movement of the plug is also precluded. The key 64 may then be attached to the boss 56 by a small weld to ensure that it does not come loose.

While the key 64 is shown as having a rectangular shape to cooperate with similarly shaped slots 54, 60 and 62, it will be appreciated that other slot (or bore) and key arrangements are within the scope of this invention.

Figure 3:
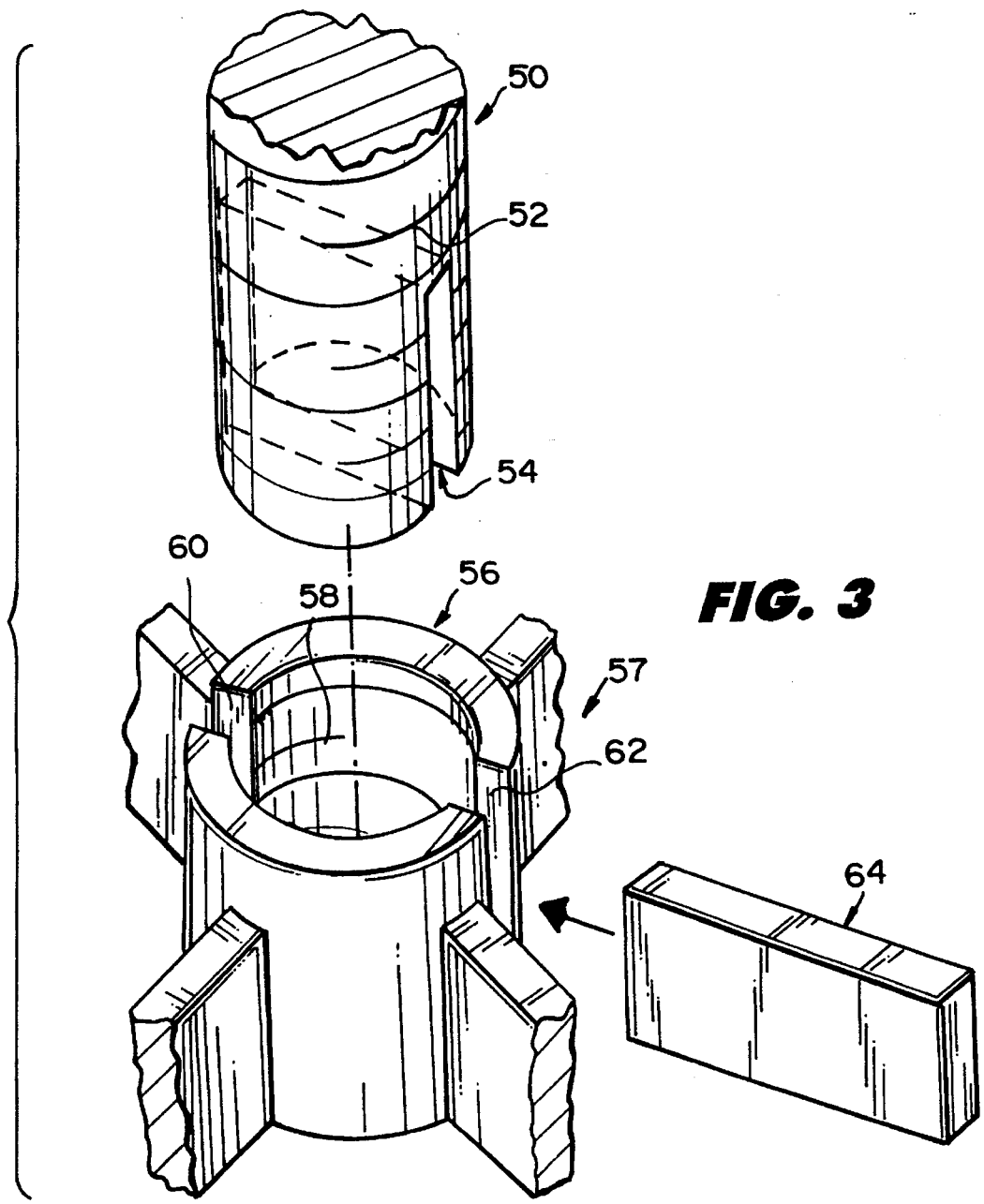
FIG. 3 is a partial perspective in exploded form illustrating the water rod attachment to a simplified lower tie plate in accordance with this invention.
Figure 4:
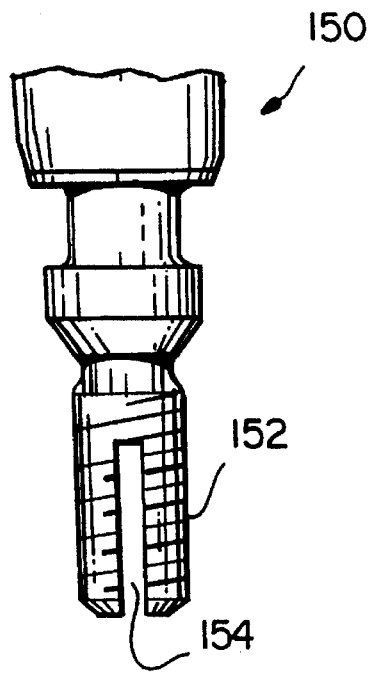
FIG. 4 is a partial side elevation of a water rod end plug in accordance with a preferred embodiment of the invention.
Figure 5:
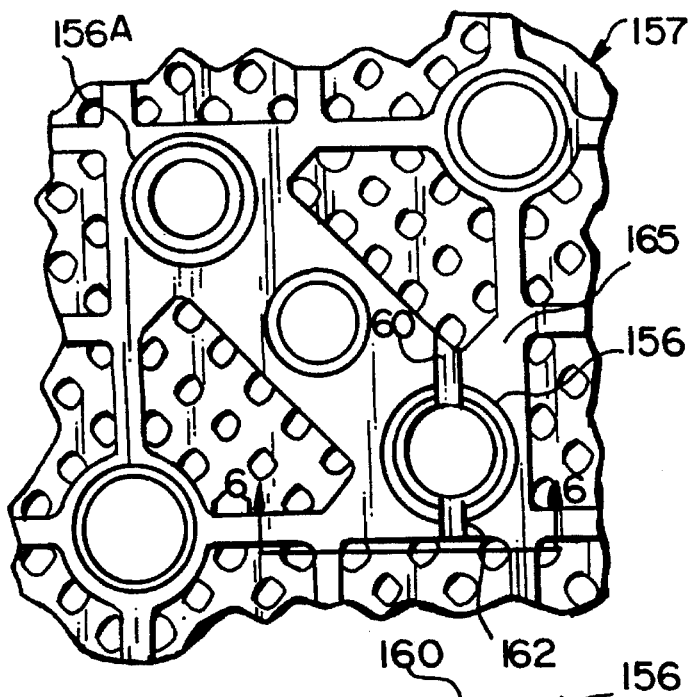
FIG. 5 is a partial top plan view of a lower tie plate in accordance with the invention.
Figure 6:
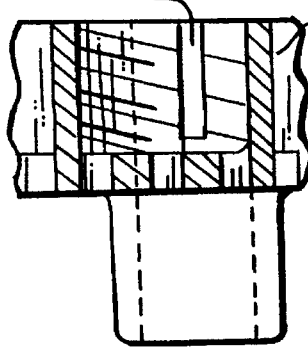
FIG. 6 is a partial side section taken through a lower tie plate boss of FIG. 5.

Turning now to FIGS. 4–6, the invention is illustrated in its preferred form, utilizing reference numerals similar to those used in FIG. 3 for corresponding elements, but with the prefix "1" added. Thus, the lower end plug 150 is threaded at 152 and is provided with a transversely oriented diametrical slot 154 which extends axially through a substantial portion of the threaded end 152. The boss 156 in the lower tie plate 157 is adapted to receive the lower end plug 150 by reason of its threaded interior surface, illustrated at 158. The boss 156 is also formed with a pair of aligned diametrically opposed slots 160, 162 within a central thickened web area 165 of the lower tie plate 157.

It is noted that the tie plate illustrated in FIG. 5 illustrates a pair of water rod bosses 156, 156A, and the boss 156A may also be modified to receive a threaded end plug of the type shown at 152.

The assembly of the end plug 150 to the lower tie plate 157 is achieved as described above in conjunction with FIG. 3 via the use of a key 64 (not shown in FIGS. 4–6).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fuel bundle assembly for a nuclear reactor wherein a plurality of fuel rods and at least one water rod extend between an upper tie plate and a lower tie plate, the improvement comprising a fixed connection between said water rod and the lower tie plate, the fixed connection including a threaded lower end plug on the water rod and a threaded hole in a boss formed in the lower tie plate adapted to receive said threaded lower end plug, said threaded lower end plug formed with a diametrical slot therein and said boss formed with a pair of slots extending from opposite sides of said hole such that said diametrical slot and said pair of slots are alignable when said threaded lower end plug is threaded into said boss; and a key insertable within the aligned diametrical slot and pair of slots to thereby fix said water rod against rotational movement.

2. The fuel bundle of claim 1 wherein said key is secured within said aligned slots.

3. The fuel bundle of claim 1 wherein said key is secured by welding.

4. The fuel bundle of claim 1 wherein said one or more water rods comprise a pair of water rods and wherein only one of the water rods incorporates said improvement.

* * * * *